(12) United States Patent
Izumino et al.

(10) Patent No.: US 6,317,277 B1
(45) Date of Patent: Nov. 13, 2001

(54) OPTICAL PICKUP DEVICE

(75) Inventors: Ryuji Izumino; Hiroaki Ito; Yoshiharu Sato; Yutaka Saito, all of Yamagata (JP)

(73) Assignees: Pioneer Electronic Corporation, Tokyo; Tohoku Pioneer Electronic Corporation, Yamagata (JP)

( * ) Notice: Subject to any disclaimer, the term of this patent is extended or adjusted under 35 U.S.C. 154(b) by 0 days.

(21) Appl. No.: 09/338,488

(22) Filed: Jun. 23, 1999

(30) Foreign Application Priority Data

Jun. 24, 1998 (JP) .................................................. 10-177730

(51) Int. Cl.$^7$ ....................................................... G02B 7/02
(52) U.S. Cl. .......................... 359/813; 359/814; 359/824; 369/44.15
(58) Field of Search ..................................... 359/813, 814, 359/823, 824; 369/44.15, 44.16, 247

(56) References Cited

U.S. PATENT DOCUMENTS 5,446,721 * 8/1995 Sekimoto et al. .................... 369/247
5,521,762 * 5/1996 Tomiyama et al. ................... 359/814

* cited by examiner

Primary Examiner—Georgia Epps
Assistant Examiner—Timothy J Thompson
(74) Attorney, Agent, or Firm—Morgan, Lewis & Bockius LLP

(57) ABSTRACT

An optical pickup device with a compact actuator has a holder that includes an objective lens and a hole formed therein. The holder is supported flexibly by a base. A focusing coil and a tracking coil are attached to at least a portion of the hole. A magnetic circuit that imparts magnetic flux to the focusing and the tracking coils is placed in the hole. The focusing and the tracking coils have magnetically fluxed and unfluxed portions. The magnetically unfluxed portions are positioned on the opposite side of the lens as that of the fluxed portions.

9 Claims, 3 Drawing Sheets

OPTICAL PICKUP DEVICE

This invention claims the benefit of Japanese Patent Application No. 10-177730, filed on Jun. 24, 1998, which is hereby incorporated by reference.

FIELD OF THE INVENTION

The present invention relates to an optical pickup device, and more particularly, to a structure of an actuator of an optical pickup device used in an optical disk drive player or recorder.

DESCRIPTION OF THE RELATED ART

Conventionally, optical pickup devices have been used for reading information recorded in pit patterns on an optical disc. A pickup device of this kind includes a laser source for emitting a light beam, a beam splitter that splits the light beam, an objective lens that focuses a light beam from the beam splitter to an optical disc surface, and a photo detector that receives the light beam reflected from the disc surface. In order to pick up pit patterns recorded on a disc surface, it is necessary to perform a focusing and a tracking operation. Therefore, the pickup device is usually equipped with an actuator, a part of which is flexibly supported with respect to a base by suspension, and on which driving coils are attached to give magnetic force in both focusing and tracking directions, i.e., directions of the focusing and the tracking operation. The actuator includes a lens holder on which the objective lens is mounted, suspension supports, focusing and tracking coils, and a magnetic circuit.

FIG. 4 shows an example of a conventional optical pickup device. In the pickup device of FIG. 4, a lens holder 101, on which an objective lens 102 is mounted, has a ring-shaped flange 101a. The lens holder 101 is flexibly supported by two pairs of suspension spring bars 103, which are positioned in parallel on both sides of the holder 101. For each pair of suspension spring bars 103, one end of the suspension spring bars is attached to the holder 101, while the other end is attached to a bank 104a of an actuator base 104, such that all of the suspension spring bars form parallel lines.

The lens holder 101 with the flange 101a has a hole in which a focusing coil 105 and a pair of tracking coils 106 are attached. The focusing coil 105 has a tube shape with rectangular cross section. One side of the focusing coil is fixed on the inside wall of the hole, and a pair of planar tracking coils 106 are glued onto the opposite side of the focusing coil 105.

A magnet 107 and a yoke 108 are placed on the actuator base 104 and form a magnetic circuit to give magnetic flux to the focusing coil 105 and the tracking coils 106. This magnetic circuit is surrounded and protected by the flange 101a.

In order to avoid undesirable movement of the pickup, such as rolling, a driving plane and the center of mass of the moving portion of the actuator should be as close as possible, ideally identical. However, in the conventional pickup of FIG. 4, because the lens is placed far from the driving plain, the flange gets bigger in an opposite direction with respect to the driving plain to balance the weight of the lens.

Accordingly, the prior art pickup device has a problem in that the actuator is large and heavy, thus making the pickup unduly large and heavy. Because of its size and weight, it is difficult to suppress undesirable movement. Because the driving plane is not close to the center of mass, the actuator causes the pickup to roll when it moves. A compact and lightweight optical pickup device is therefore difficult to realize because of the substantial size of the actuator.

SUMMARY OF THE INVENTION

Accordingly, the present invention is directed to an optical pickup device that obviates one or more of the problems due to limitations and disadvantages of the related art.

It is an object of the present invention to solve the aforementioned problems by providing an optical pickup device with a compact actuator that minimizes the size and weight of the optical pickup device.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an optical pickup device of the present invention includes a holder which contains an objective lens and a hole, the holder being supported flexibly to a base; a focusing coil and a tracking coil that are partially attached to the hole; and a magnetic circuit which gives magnetic flux to the focusing and the tracking coils being placed in the hole; wherein the focusing and the tracking coils have magnetically fluxed and unfluxed portions, and wherein the magnetically unfluxed portions are positioned on the opposite side of the lens with respect to the fluxed portion.

In another aspect, an optical pickup device includes a holder that contains an objective lens and a hole, the holder being supported flexibly to a base; a bobbin on which wires are wound to form a focusing coil and a tracking coil, the bobbin being attached to the holder; and a magnetic circuit which gives magnetic flux to the focusing and the tracking coils; wherein the focusing and the tracking coils have magnetically fluxed and unfluxed portions, and wherein the magnetically unfluxed portions are positioned on the opposite side of the lens with respect to the fluxed portion.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
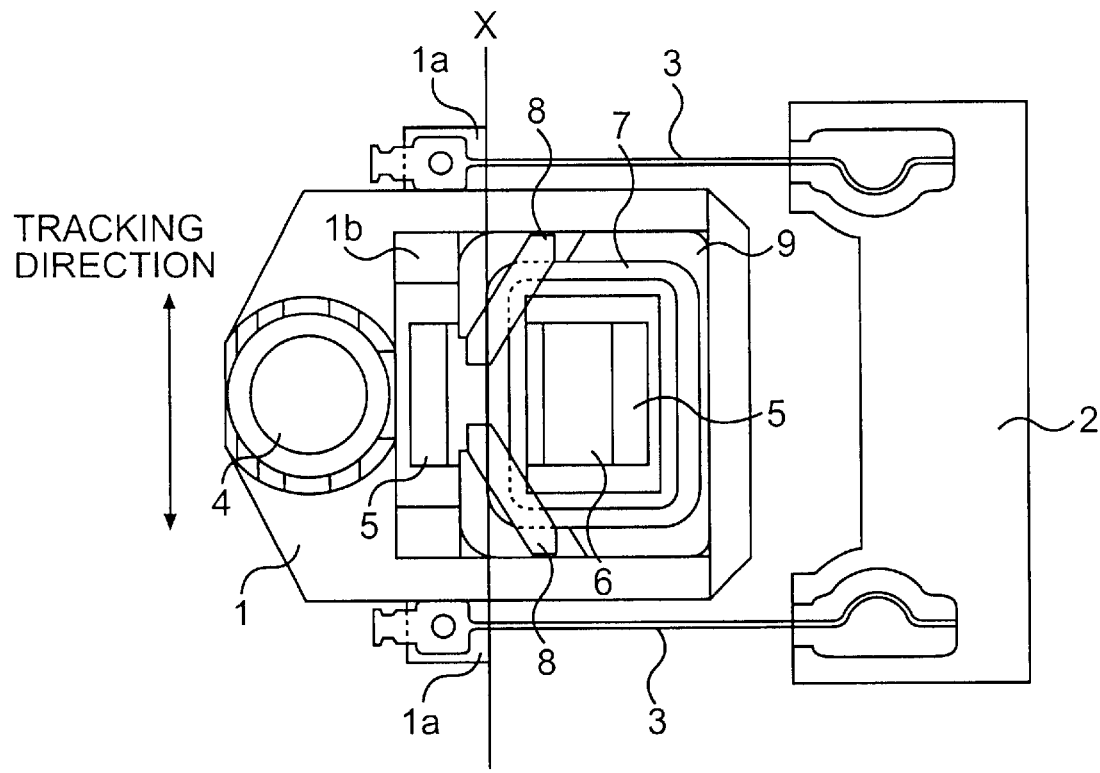
FIG. 1 illustrates a top view of an embodiment of the pickup device of the present invention.
Figure 2:
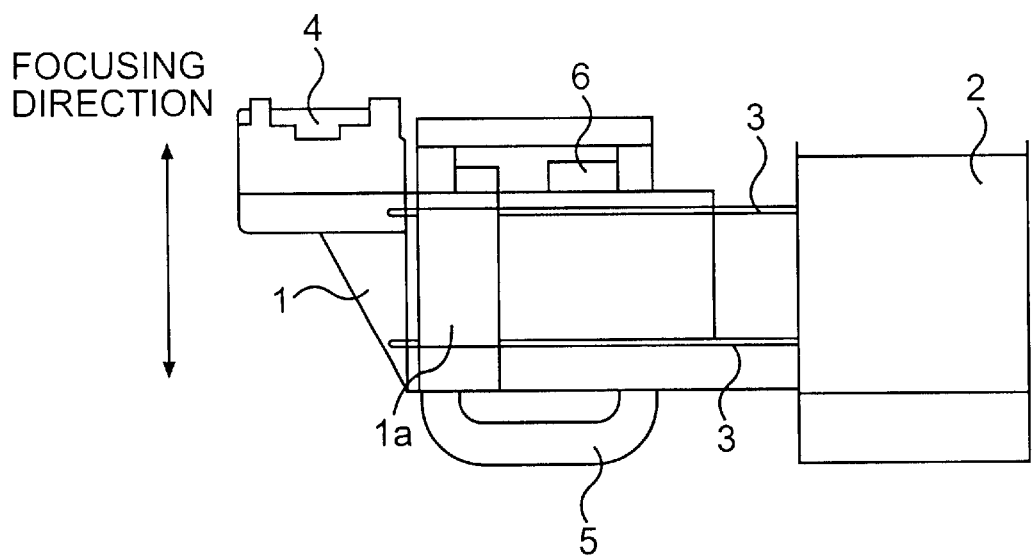
FIG. 2 illustrates a side view of an embodiment of the pickup device of the present invention.

FIGS. 1 and 2 show a structure of an optical pickup device of the present invention. In those figures, a holder 1 is a body of a moving portion, and supported flexibly on a base 2.

The holder 1 has a pair of suspension connecting portions 1a on both sides. Two pairs of suspension spring bars 3 are placed in parallel on both sides of the holder 1 such that there is a pair on each side. Each of the suspension spring bars extends in a direction that is perpendicular to both the focusing and tracking directions, as shown in FIGS. 1 and 2. Two spring suspension bars on each side are also separately placed with respect to a focusing direction. One pair of ends of each of the suspension spring bars 3 is fixed on the suspension connecting portions 1a, while the other pair of ends is fixed on the base 2. Thus, the holder 1 is floatingly supported by the suspension spring bars 3, and is able to move in both focusing and tracking directions.

The holder 1 also includes an objective lens 4 at its one end and a rectangular hole 1b at about the center. A magnetic circuit is composed of a yoke 5 and magnet 6, both of which are fixed on the pickup device. A bobbin 9, on which a focusing coil 7 and a pair of tracking coils 8 are formed, is attached on the inside wall of the hole 1b, while the magnetic circuit is also placed in the hole 1b. As described above, a moving portion of an actuator includes the holder with the objective lens 4 and the bobbin 9.

Figure 3:
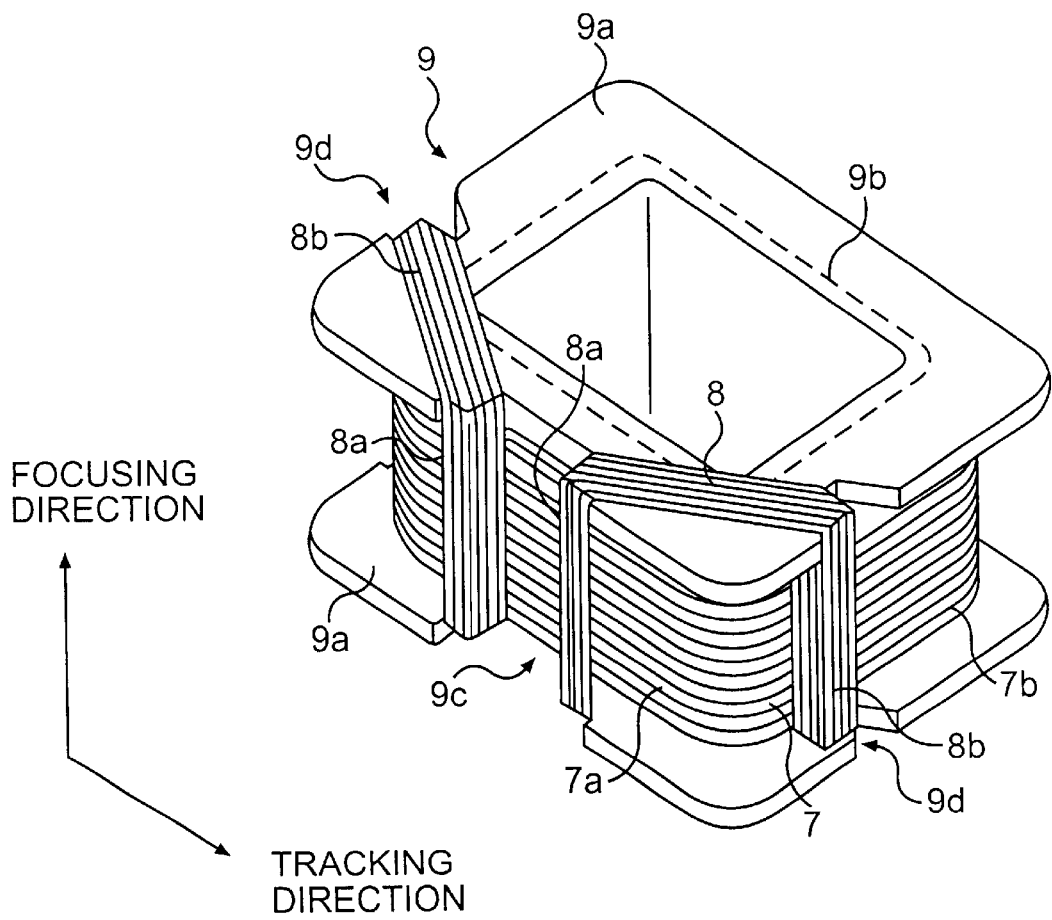
FIG. 3 illustrates an overview of the focusing and tracking coils of an embodiment of the present invention.
Figure 4:
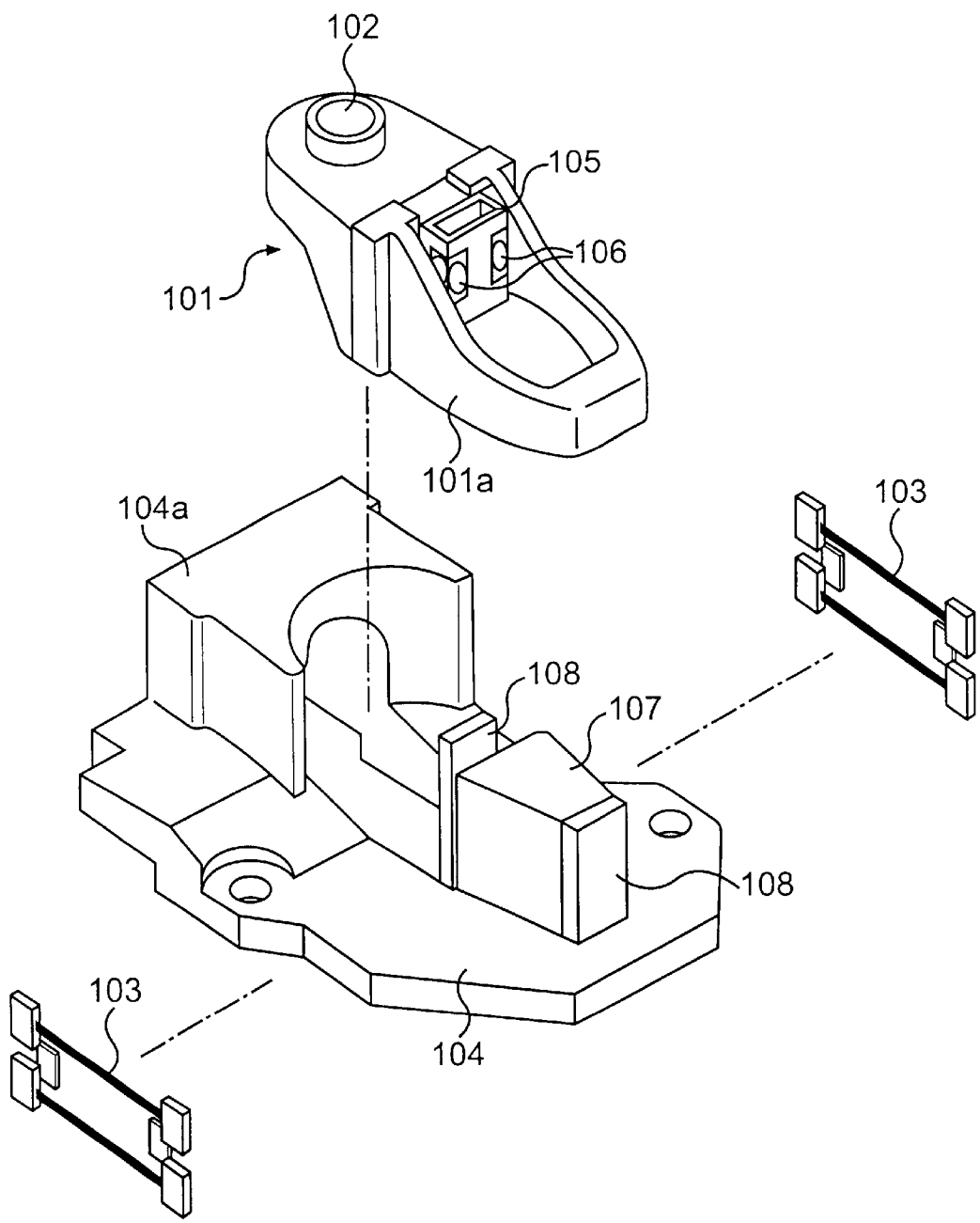
FIG. 4 illustrates an overview of a conventional pickup device.

As shown in FIG. 3, the bobbin 9 is a rectangular cross-sectioned tube with one open side, such that it has a U-shaped cross section. The bobbin 9 also has a pair of brims 9a on its top and bottom ends. A wire is wound around the focusing coil attaching portion 9b between the brims 9a. A portion of the focusing coil 7 corresponding to the open side of the bobbin is to be a magnetically fluxed portion 7a by the magnetic circuit. The rest of the focusing coil 7, i.e., portions corresponding to other three sides of the bobbin 9, is to be a magnetically unfluxed portion 7b. The brims 9a have a pair of notches 9c on the fluxed side and two pairs of notches 9d on sides adjacent to the fluxed side. A pair of wires is separately wound around the notches to form a pair of tracking coils 8, as shown in FIG. 3. Portions of the tracking coils 8 over the fluxed portion 7a of the focusing coil 7 become fluxed portions 8a. Portions of the tracking coils 8 other than the fluxed portion 8a become unfluxed portions 8b.

Accordingly, the fluxed portions of both the focusing coil 7a and the tracking coils 8a form parallel planes that overlap closely together, and are parallel to both the focusing and tracking directions.

In the conventional structure, a pair of tracking coils is made separately and glued onto a focusing coil. With this structure, it is necessary to take at least two steps, by first making a pair of tracking coils, and then gluing them onto the focusing coil. It also takes time and labor to manufacture a combination of the coils, because some additional work, such as applying adhesives, positioning the tracking coils, etc. Is necessary. However, according to the present embodiment, the tracking coils 8 can be made by simply winding a pair of wires on the bobbin 9 over the focusing coil 7. Thus, winding a pair of wires is the only step necessary for both making and attaching the tracking coils in the appropriate positions. Therefore, this structure saves time and labor in manufacturing the combination of the coils, and as a result, reduces the cost of production.

The magnetic flux is given to both the fluxed portion 7a of the focusing coil 7 and the fluxed portions 8a of tracking coils 8 by the magnetic circuit, because the fluxed portions 7a and 8a of the coils are placed in a magnetic gap of the ma nematic circuit in the hole 1b of the holder 1. The fluxed portion 7a of the focusing coil 7 becomes a driving plane of the focusing, operation, and the fluxed portions 8a of tracking coils 8 make driving planes of the tracking, operation. Both driving planes of the focusing and the tracking operations are overlapping, such that they are close enough together to be regarded as almost a single plane.

As shown in FIG. 1, the fluxed portion 7a of the focusing coil 7 is positioned closely to the objective lens 4, and the unfluxed portion 7b of the focusing coil 7 is positioned on the opposite side of the objective lens 4 with respect to the line X along the tracking direction. Similarly, the fluxed portions 8a of the tracking coils 8 are positioned closely to the objective lens 4, and the unfluxed portions 8b of the tracking coils 8 are positioned on the opposite side of the objective lens 4 with respect to the line X, and outside the magnetic gap provided by the magnetic circuit.

As a result, the objective lens 4 and the unfluxed portions 7b and 8b of the focusing and tracking coils are facing each other with respect to the fluxed portions 7a and 8a. Thus, the weight of the unfluxed portions 7b and 8b balances the weight of the objective lens 4. As a result, fluxed portions 7a and 8a are close to the center of mass of the moving portion. Therefore, it is possible to make the center of mass of the moving portion of the actuator and the driving planes identical, or close enough to be regarded as identical, without increasing the weight of the holder 1, because the weight of the unfluxed portions 7b and 8b works as a weight balancer of the objective lens 4.

Also as shown in FIG. 1, both the focusing coil 7 and the tracking coils 8 are symmetrically constructed with respect to a plane which goes through the center of the objective lens 4 and perpendicular to the tracking direction. Therefore, the weight balance of the moving portion is always maintained, even after movement in the tracking direction, regardless of the weight of the focusing and tracking coils. This is because the center of mass of the moving portion of the actuator stays at the same position, thereby restricting the undesired rolling.

Accordingly, the weight distribution of the moving portion of the actuator is symmetrically balanced with respect to the driving plane of the focusing operation and the tracking operation. At the same time, the weight distribution of the moving portion of the actuator is also symmetrically balanced with respect to the plane perpendicular to and at the center of the driving plane. Further, because the unfluxed portions 8b of the tracking coils 8 are positioned away from a magnetic gap of the magnetic circuit, there is little magnetic flux that is leaked from the magnetic circuit to affect the unfluxed portions 8b. Therefore, the undesired force applied to the tracking coils 8 can be suppressed. Similarly, since the unfluxed portion 7b of the focusing coil 7 is placed completely outside of the magnetic gap, no undesired force is applied to the focusing coil 7 by the magnetic circuit.

As described above, according to the present embodiment, an optical pickup can be designed such that the driving plane and the center of mass of the moving portion are identical without increasing the size of the holder, because the unfluxed portions of the focusing coil and the tracking coils balance the objective lens in terms of weight. As a result, it is also possible to realize a compact actuator, and consequently, the corresponding optical pickup device can be minimized in both size and weight. The inexpensive pickup device has a single focusing coil and a pair of tracking coils on a single bobbin and can be driven by a single magnetic circuit.

It will be apparent to those skilled in the art that various modifications and variations can be made in the optical pickup device of the present invention without departing from the spirit or scope of the invention. Thus, it is intended that the present invention covers the modifications and variations of this invention provided they come within the scope of the appended claims and their equivalents.

What is claimed is:

1. An optical pickup device comprising:

a holder comprising an objective lens and a hole Structure, the holder being flexibly supported by a base;

a focusing coil and a tracking coil coupled to at least a portion of the hole structure; and a magnetic circuit, positioned in the hole structure for imparting magnetic flux to the focusing and the tracking coils such that the focusing coil includes a magnetically fluxed first side and an unfluxed second side, the tracking coil includes magnetically fluxed and unfluxed portions, and the magnetically unfluxed portions of the tracking coil are positioned on the unfluxed second side.

2. An optical pickup device comprising:

a holder comprising an objective lens and a hole structure, the holder being flexibly supported by a base;

a focusing coil and a tracking coil coupled to at least a portion of the hole structure; and a magnetic circuit, positioned in the hole structure for imparting magnetic flux to the focusing and the tracking coils such that the focusing and tracking coils have magnetically fluxed and unfluxed portions, and the magnetically unfluxed portions are positioned on an opposite side of the objective lens with respect to the magnetically fluxed portions, wherein the fluxed portions of the focusing and the tracking coils are positioned in a magnetic gap of the magnetic circuit such that driving planes associated with focusing and tracking operations of the coils respectively overlap.

3. An optical pickup device comprising:

a holder comprising an objective lens and a hole structure, the holder being flexibly supported by a base;

a focusing coil and a tracking coil coupled to at least a portion of the hole structure; and a magnetic circuit, positioned in the hole structure for imparting magnetic flux to the focusing and the tracking coils such that the focusing and tracking coils have magnetically fluxed and unfluxed portions, the magnetically unfluxed portions are positioned on an opposite side of the objective lens with respect to the magnetically fluxed portions, and the fluxed portions of the focusing and tracking coils form planes parallel to both focusing and tracking directions associated with the focusing and tracking coils, respectively.

4. The optical pickup device according to claim 1, wherein both the focusing and tracking coils are symmetrically positioned with respect to a plane perpendicular to a tracking direction associated with at least the tracking coil.

5. An optical pickup device comprising:

a holder comprising an objective lens and a hole structure, the holder being flexibly supported by a base;

a bobbin on which wires are wound to form a focusing coil and a tracking coil, the bobbin coupled attached to the holder; and a magnetic circuit for imparting magnetic flux to the focusing and the tracking coils such that the focusing coil includes a magnetically fluxed first side and an unfluxed second side, the tracking coil includes magnetically fluxed and unfluxed portions, and the magnetically unfluxed portions of the tracking coil are positioned on the unfluxed second side.

6. An optical pickup device comprising:

a holder comprising an objective lens and a hole structure, the holder being flexibly supported by a base;

a bobbin on which wires are wound to form a focusing coil and a tracking coil, the bobbin coupled attached to the holder; and a magnetic circuit for imparting magnetic flux to the focusing and the tracking coils such that the focusing and the tracking coils have magnetically fluxed and unfluxed portions, and the magnetically unfluxed portions are positioned on an opposite side of the objective lens with respect to the magnetically fluxed portions, wherein a wire is wound around the bobbin to form the focusing coil, another wire is wound around the bobbin over the focusing coil to form the tracking coil, and portions of the focusing and tracking coils corresponding to an open side of the bobbin become the magnetically unfluxed portions.

7. An optical pickup device comprising:

a holder comprising an objective lens and a hole structure, the holder being flexibly supported by a base;

a bobbin on which wires are wound to form a focusing coil and a tracking coil, the bobbin coupled attached to the holder; and a magnetic circuit for imparting magnetic flux to the focusing and the tracking coils such that the focusing and the tracking coils have magnetically fluxed and unfluxed portions, and the magnetically unfluxed portions are positioned on an opposite side of the objective lens with respect to the magnetically fluxed portions, wherein the fluxed portions of the focusing and the tracking coils are positioned in a magnetic gap of the magnetic circuit such that focusing and tracking diving planes associated with the focusing and tracking coils, respectively, overlap.

8. An optical pickup device comprising:

a holder comprising an objective lens and a hole structure, the holder being flexibly supported by a base;

a bobbin on which wires are wound to form a focusing coil and a tracking coil, the bobbin coupled attached to the holder; and a magnetic circuit for imparting magnetic flux to the focusing and the tracking coils such that the focusing and the tracking coils have magnetically fluxed and unfluxed portions, the magnetically unfluxed portions are positioned on an opposite side of the objective lens with respect to the magnetically fluxed portions, and the fluxed portion of the focusing and tracking coils form planes parallel to both focusing and tracking directions associated with the focusing and tracking coils, respectively.

9. The optical pickup device according to claim 5, wherein both the focusing and tracking coils are symmetrically positioned with respect to a plane which is perpendicular to a tracking direction associated with at least the tracking coil.

* * * * *